United States Patent [19]
Lavey

[11] Patent Number: 5,530,648
[45] Date of Patent: Jun. 25, 1996

[54] APPARATUS AND METHOD FOR ADJUSTING SUSPENSION HEIGHT TO REDUCE VEHICLES STEERING EFFORT

[75] Inventor: Daniel W. Lavey, Farmington Hills, Mich.

[73] Assignee: Ford Motor Company, Dearborn, Mich.

[21] Appl. No.: 55,102

[22] Filed: May 3, 1993

[51] Int. Cl.$^6$ .................................................. B60G 17/08
[52] U.S. Cl. ...................... 364/424.05; 280/6.1; 280/840; 180/41; 180/446
[58] Field of Search .............................. 364/424.05, 434, 364/559, 565, 571.03; 280/707, 489, 840, 6.1, 43; 180/41, 140, 141, 142, 79.1; 303/112

[56] References Cited

U.S. PATENT DOCUMENTS

| | | | |
|---|---|---|---|
| 2,967,062 | 1/1961 | D'Avigdor | 280/112 |
| 3,497,198 | 2/1970 | Miller | 267/35 |
| 4,050,704 | 9/1977 | Duca | 280/840 |
| 4,247,126 | 1/1981 | Claxton | 280/6.12 |
| 4,700,972 | 10/1987 | Young | 280/661 |
| 4,787,644 | 11/1988 | Yokote et al. | 280/6 R |
| 4,803,630 | 2/1989 | Takizawa et al. | 364/424.05 |
| 4,834,419 | 5/1989 | Kozaki | 280/707 |
| 4,844,506 | 7/1989 | Moriguchi et al. | 280/689 |
| 4,865,148 | 9/1989 | Marumoto et al. | 180/141 |
| 4,936,604 | 6/1990 | Kawagoe et al. | 280/840 |
| 4,951,199 | 8/1990 | Whitehead | 364/424.05 |
| 4,999,776 | 3/1991 | Soltis | 364/424.05 |
| 5,015,006 | 5/1991 | Takehara et al. | 280/707 |
| 5,083,275 | 1/1992 | Kawagoe et al. | 364/424.05 |
| 5,301,766 | 4/1994 | Momiyama et al. | 180/197 |

Primary Examiner—Kevin J. Teska
Assistant Examiner—Tan Q. Nguyen
Attorney, Agent, or Firm—Gregory P. Brown; Roger L. May

[57] ABSTRACT

An apparatus and method for reduces the steering effort applied by a driver to a steering wheel of a vehicle to maintain straight line tracking of the vehicle. The apparatus includes an adjustable suspension unit interposed between a steerable road wheel and a chassis of the vehicle to adjust the chassis ride height. The apparatus further includes ride height sensors, an inclinometer, a steering effort sensor, and a processor for determining a desired ride height setting that will reduce the steering effort required to maintain the straight line tracking of the vehicle.

7 Claims, 3 Drawing Sheets

APPARATUS AND METHOD FOR ADJUSTING SUSPENSION HEIGHT TO REDUCE VEHICLES STEERING EFFORT

BACKGROUND OF THE INVENTION

1. Field of the Invention

The present invention relates generally to an apparatus for reducing steering effort. More specifically, the present invention relates to an apparatus and method for adjusting a vehicle suspension to reduce the steering effort the driver must exert to keep the vehicle travelling in a straight line.

2. Disclosure Information

Drift refers to the lateral displacement of the vehicle on the road when no effort is applied to the steering wheel by the driver. Pull refers to the steering effort or torque the driver applies to the steering wheel to overcome drift. Drivers mistakenly perceive drift and pull as an indication of misalignment of the suspension. However, drift and pull occur often as a result of a road crown, cross wind and other external factors. Road crown refers to the angle between the horizon and the surface of the road beneath and between the steerable roadwheels. A road with the left hand side higher than the right hand side is referred to as having a positive road crown. A positive road crown will cause a vehicle to drift to the right. Cross wind refers to a wind blowing substantially perpendicular to the line of travel of the vehicle. A cross wind blowing on the left hand side of the vehicle will cause a vehicle to drift to the right. It would be desirable to have a suspension that could be adjusted to reduce the pull due to road crown and other external factors.

U.S. Pat. Nos. 4,050,704, and 4,247,126 disclose the use of height adjustable suspension units to control the sway of a vehicle for flexibility for harvesting crops on steeply graded hillsides without spilling the cargo or loosing traction. One primary object of these systems is to allow independent orientation of the vehicle body, relative to the underlying ground, while maintaining tire to ground contact. Neither of these systems teaches adjusting the height of the suspension units to maintain straight line tracking of the vehicle.

U.S. Pat. No. 2,967,062 also discloses height adjustable suspension units to control the sway or pitch of a vehicle to keep the body of the vehicle level during cornering, accelerating and braking. The system does not teach any mechanism for reducing steering efforts to maintain straight line vehicle tracking.

It would be desirable to provide an apparatus and method that substantially reduces the steering effort a driver must apply to keep a vehicle traveling in a straight line on a straight portion of road.

SUMMARY OF THE INVENTION

The present invention advances beyond the above described systems by providing an apparatus and method for reducing the steering effort applied by a driver to a steering wheel of a vehicle to maintain straight line tracking of the vehicle. The apparatus comprises at least one adjustable suspension unit interposed between a steerable road wheel and a chassis of the vehicle. The apparatus also includes a processor adapted for determining a road crown compensation factor and for calculating suspension adjustment of the suspension units based upon the factor. The apparatus further comprises a suspension controller for adjusting the suspension unit corresponding to the road crown compensation factor so as to reduce steering effort required to maintain straight line tracking of the vehicle.

The present invention further provides a method for reducing the steering effort applied by a driver to a steering wheel of a vehicle to maintain straight line tracking of the vehicle. The method includes the steps of:

(a) continuously measuring a deviation in ride height at each adjustable suspension unit of the steerable road wheels while the vehicle is traveling and generating a height signal corresponding to the ride height;

(b) determining a road crown compensation factor and generating a compensation factor signal corresponding to the road crown compensation factor;

(c) determining a desired ride height based upon the ride height and compensation factor signals and generating a desired ride height signal corresponding to the desired ride height; and (d) commanding the adjustable suspension unit to adjust the chassis to the desired ride height, thereby reducing the steering effort required to maintain vehicle straight line tracking.

One advantage the present invention provides is to reduce the steering effort required by the driver to maintain vehicle straight line tracking. For some drivers, this effort is improperly perceived as an indication of misalignment. Thus, elimination of this misperception will increase driver satisfaction.

Other objects, features and advantages of the present invention will become apparent to those skilled in the art from the drawings, detailed description and claims which follow.

DETAILED DESCRIPTION OF THE PREFERRED EMBODIMENTS

Figure 1:
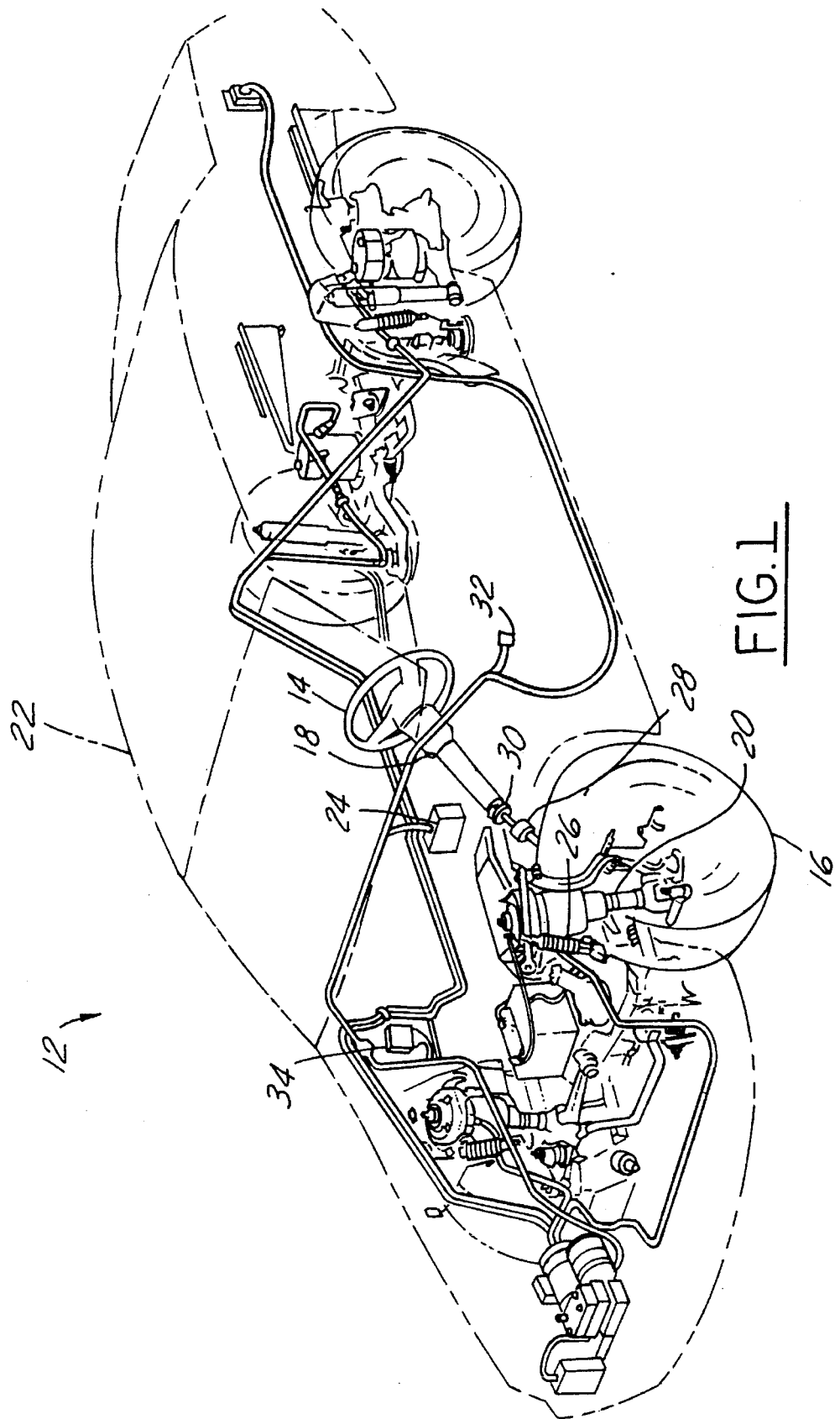
FIG. 1 is a perspective drawing of a motor vehicle incorporating the present invention.

Referring now to the drawings, FIG. 1 shows a vehicle 12 equipped with the present invention. The vehicle 12 includes a steering wheel 14, a front set of steerable roadwheels 16, a steering shaft 18, a steering gear and a pair of tie rods, all cooperating in a known manner to connect the steering wheel 14 to the roadwheels 16. Suspension units 20 are interposed between the chassis 22 and the roadwheels 16.

As further shown in FIG. 1, the apparatus of the present invention includes adjustable suspension units 20. Suspension units 20 are preferably constructed in a known manner such as is disclosed in U.S. Pat. No. 3,497,198, assigned to the assignee of the present invention. U.S. Pat. No. 3,497,198 discloses means for constructing a strut or shock absorber in combination with an air spring. An air pressure controller provides different air pressure at the spring bellows, causing the spring bellows to expand and compress, thereby raising and lowering the chassis 22 relative to the roadwheel 16. However, other types of known adjustable suspension units 20 may be utilized as well, it being understood that the present invention is not meant to be limited solely to the air adjustable suspension unit. For example, hydraulic and electronic suspension units would provide equivalent functionality.

Suspension units 20 generally operate in response to a signal generated from height sensors 26 which are preferably constructed in a known manner such as is disclosed in U.S. Pat. No. 5,031,934 or 5,083,454, also assigned to the assignee of the present invention. As is known to those skilled in the art, the height sensors 26 generate continuous analog voltage signals corresponding to the deviation from a nominal vertical distance between the chassis 22 and the roadwheels 16, this distance being commonly referred to as ride height. Alternatively, ride height is the measurement of the distance between the chassis 22 and the ground at a particular point on the chassis. Here, the ride height is measured at each of the suspension units on the car. For purposes herein disclosed, the ride height value ignores tire deflection. A vehicle is designed to operate at design ride height. Vehicles equipped with height adjustable suspension units can adjust the actual ride height to maintain the design ride height under varying loads. Ride height sensors 26 may also be integrated within suspension unit 20 with equivalent functionality.

As shown in FIG. 1, the vehicle is also equipped with a steering position sensor 30. The steering position sensor 30 is preferably constructed in a known manner such as is disclosed in U.S. Pat. No. 4,999,776, also assigned to the assignee of the present invention. As shown therein, the sensor 30 determines the angular position of the steering wheel 14 from an initial reference position. Additionally, the velocity of the vehicle is determined by a speed sensor 32 attached to the transmission. Alternatively, the speed sensor could comprise a combination of Hall-effect sensors located at any one or more of the wheels to generate a signal relative the velocity of the vehicle.

The vehicle further includes an inclinometer 24 for determining the relative roll angle of the chassis from the true horizontal. The inclinometer 24 may comprise any of a number of known electronic leveling tools such as level transducers or digital inclinometer. The inclinometer 24 generates a continuous analog voltage signal corresponding to the angular deviation of the chassis relative to the true horizontal.

The vehicle is also equipped with a steering effort sensor 28 mounted between the steering wheel 14 and the tie rod ends. The steering effort sensor 28 may comprise any of a number of known electronic torque transducers. One example of the type of torque transducers preferred is Model 01015 as manufactured Sensor Developments Inc. of Lake Orion, Mich. This torque transducer is integrally designed into the intermediate shaft of the steering column and generates a continuous analog voltage signal corresponding to the effort the driver applies to the steering wheel 14. It should be readily apparent to one of ordinary skill in the art that many transducers exist that would function equivalently. One such example of an alternative steering effort sensor design utilizes electrical pressure transducers mounted at either end of the steering rack to sense pressure deviations in the hydraulic power steering system.

Figure 2:
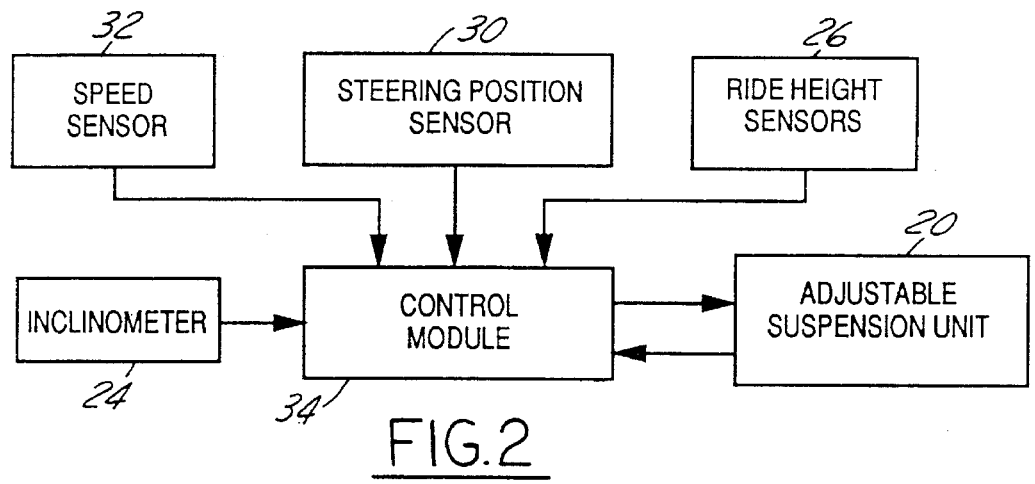
FIG. 2 is an overall system block diagram in accordance with one embodiment of this invention.
Figure 3:
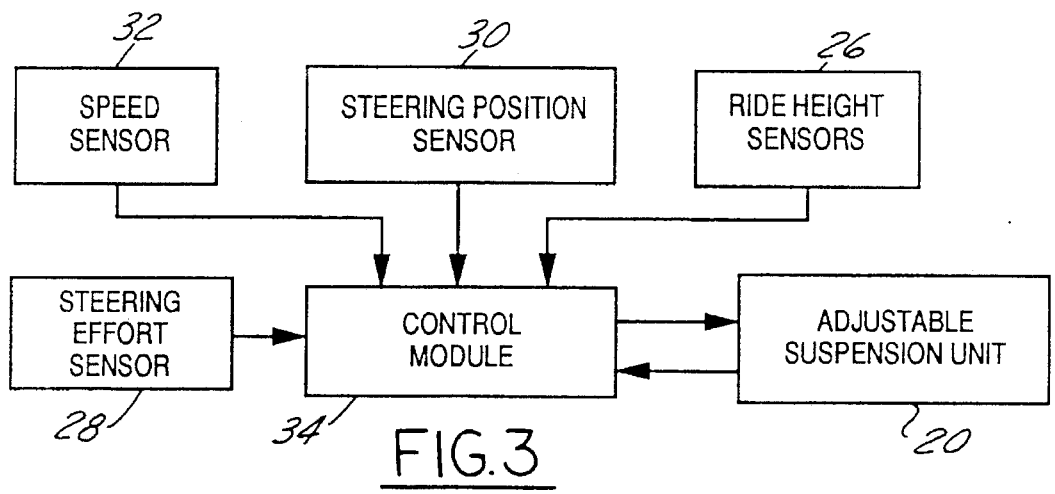
FIG. 3 is an overall system block diagram in accordance with an alternative embodiment of this invention.

The component parts of a system according to two embodiments of the present invention are shown in FIGS. 2 and 3. As will be explained in greater detail below, the embodiment of FIG. 2 includes an inclinometer 24. The embodiment of FIG. 3 includes a steering effort sensor 28. However the present invention also contemplates a system having both an inclinometer 24 and a steering effort sensor 28. Accordingly, control module 34 contains a processor that could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with the suspension unit 20, inclinometer sensor 24, height sensor 26, steering effort sensor 28, steering position sensor 30, speed sensor and a random access memory (RAM) for temporarily holding data while the data are being processed. The processor dynamically determines the desired ride height to reduce the steering effort required to maintain straight line tracking of the vehicle. The operation of the apparatus will be explained with reference to the logic flow diagram of FIG. 4.

Figure 5:
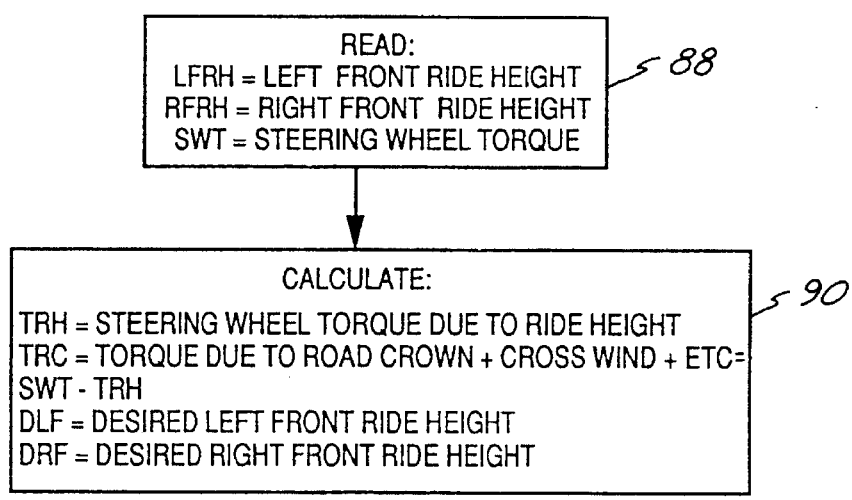
FIG. 5 is a logic flow block diagram in accordance with the principles of the present invention.
Figure 4:
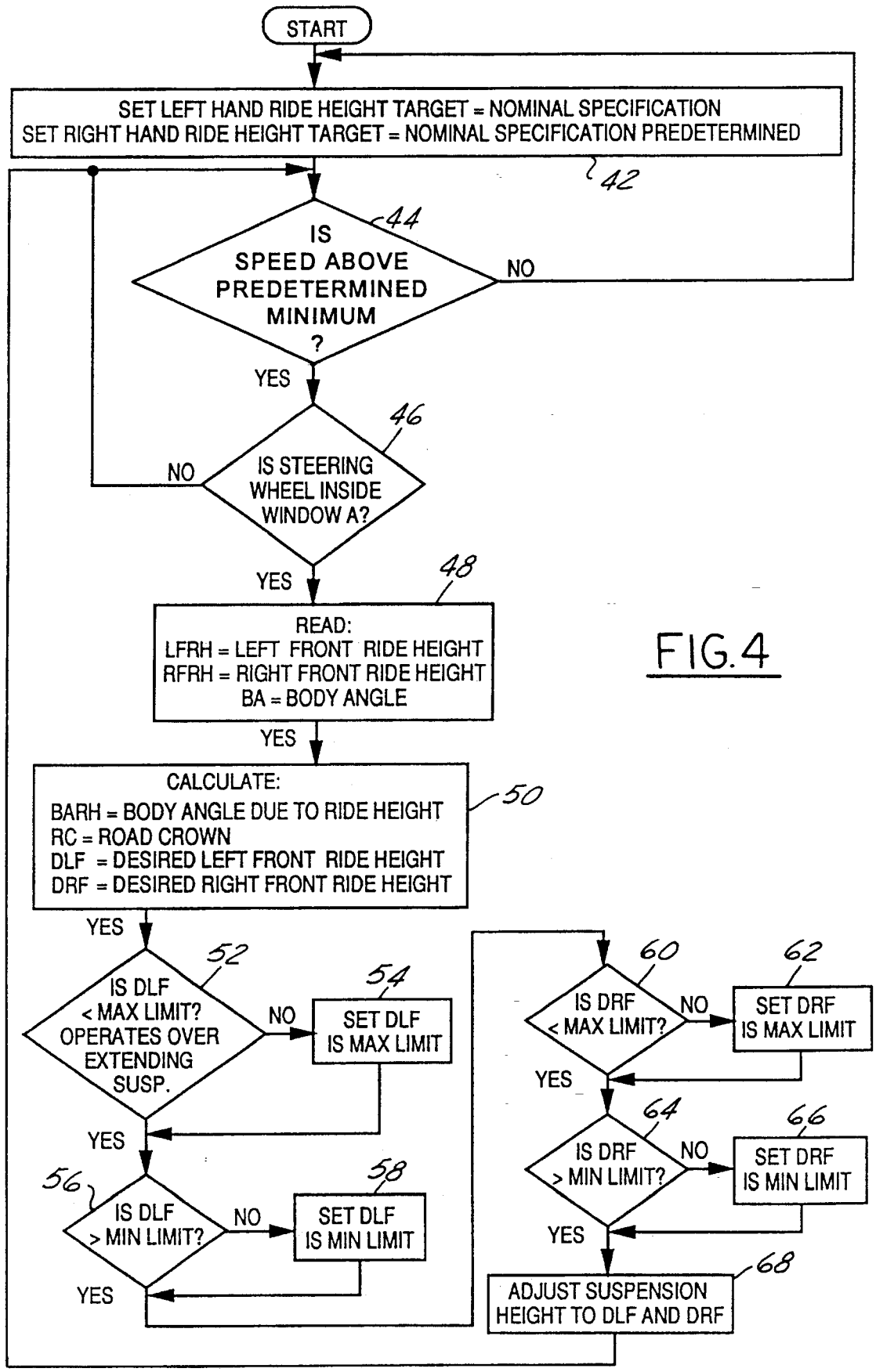
FIG. 4 is a logic flow block diagram in accordance with the principles of the present invention.

In accordance with the two embodiments of this invention the following of terms are employed in FIGS. 4 and 5:
TW=tread width constant measured from design;
$K_1$=ride height adjustment constant empirically determined;
RHS=predetermined nominal right and left ride height specification;
$LF_{rh}$=left front ride height as read by height sensor;
$RF_{rh}$=right front ride height as read by height sensor;
BA=body angle relative to true horizontal as read by inclinometer means;
BARH=body angle due to ride height;
RC=road crown;
TRH=steering wheel torque due to ride height;
TRC=Torque due to road crown, tires, alignment, cross wind, etc.;
SWT=steering wheel torque as measured by torque sensing means;
$DLF_{rh}$=desired left front ride height; and
$DRF_{rh}$=desired right front ride height.

Utilizing a system having an inclinometer 24, as shown in FIG. 2, the present invention operates according to a method as shown schematically in FIG. 4. Beginning at the start block 40, the processor within control module 34 transfers to block 42 and commands suspension unit 20 to initial nominal value, RHS. The processor then transfers to block 44 and reads the vehicle speed sensor 32. The processor will not transfer to block 46 until the vehicle Speed exceeds a predetermined minimum. This prevents system activation below speeds where system corrections are unnecessary. Experimentation indicates adjustments are unnecessary below about 20 mph, however, the system will operate effectively at all speeds. When the vehicle velocity exceeds the predetermined minimum, the processor transfers to block 46 and reads the steering position sensor 30. The processor determines if the steering wheel 14 is within a predetermined window, A. Window A is defined such that if the processor finds that the wheel 14 is within window A, then the vehicle is traveling on a straight segment of road. If the vehicle is traveling on straight road, the processor will transfer to block 48. If the steering wheel is not within window A, then the vehicle is not; traveling down a straight segment of road and the processor will transfer back to block 44.

Having established that the vehicle is traveling at sufficient speed down a substantially straight road, block 48 instructs the processor to query the height sensors 26 at the right and left front suspension units 20 and the inclinometer 24. The processor then transfers to block 50 and calculates, according to several relationships to be described below, a desired ride height for the left and right front suspension unit, that will compensate for road crown induced pull.

First, the processor calculates the body angle due to ride height. The inclinometer 24 generates a signal, BA, representing the angle due to road crown, RC, combined with the angle due to side-to-side variation in suspension ride height, BARH. The angle due to side-to-side variation in suspension ride height can be calculated by many methods. One method described herein utilizes the ride height data measured at the left and right front suspension units 20 and the distance between the front tires, the tread width, TW, in the following relationship:

$$BARH = Tan^{-1}\{(LF_{rh} - RF_{rh})/TW\}.$$

Subtracting BARH from BA yields the body angle due to road crown, RC.

The processor then determines the desired left and right front ride heights that will reduce the steering effort to maintain vehicle straight line tracking. The processor utilizes three constants, RHS, TW and $K_1$, to determine the road crown compensation factor, and determines the ride heights according to the following relationships:

$$DLF_{rh} = RHS - \frac{1}{2} * TW * Tan(RC * K_1);$$

$$DRF_{rh} = RHS + \frac{1}{2} * TW * Tan(RC * K_1).$$

As mentioned previously, RHS is the nominal suspension ride height specification, TW is the tread width, RC is the road crown, and the tuning factor K1 is empirically determined through system testing. It should be immediately apparent that if the road crown is zero, the suspension will remain at the predetermined nominal height, RHS. It should be further apparent that the present embodiment evenly distributes the correction between the two suspension units 20.

Next, the processor, at blocks 52 through 66, assures the desired ride heights are within predetermined minimum and maximum height limits of the suspension units 20. The maximum limit here represents the maximum extension of the suspension units 20 for pull compensation. Similarly the minimum represents the lowest allowable ride height for pull compensation. Blocks 52 and 60 ask whether the desired ride height values are less than the maximum limits. Blocks 54 and 62 accept the values if they are less than the maximum limits. If the value is equal to or greater than the maximum limit, blocks 54 and 62 set the desired ride height value equal to the maximum limit. Similarly, blocks 56 and 64 ask whether the desired ride height values are less than the minimum limits, and blocks 58 and 66 set the desired ride height value equal to the minimum limit if the calculated value is not greater than the minimum limit.

Finally, the processor transfers to block 68 and commands the suspension units 20 to adjust to the desired ride height. After the processor sends the adjustment command, the processor transfers back to block 44. The processor then determines the vehicle speed and if it is below the predetermined minimum speed, the processor will transfer back to block 42, where the processor commands the suspension units 20 to adjust to their nominal ride height specification. If the speed is still above the minimum, or when it once again rises above the minimum, the processor will repeat the steps outlined above as necessary to adjust the suspension units 20 to reduce the steering effort required to maintain vehicle straight line tracking.

In another embodiment of the present invention, as shown in FIGS. 3 and 5, a steering effort sensor 28 is utilized rather than an inclinometer 24. Operation of this embodiment is very similar to that described above with reference to FIGS. 2 and 4. Referring to FIGS. 4 and 5, blocks 40-46 are as described above and blocks 48 and 50 are replaced by blocks 88 and 90. A description of the differences follows.

Referring to FIG. 5, block 88 instructs the processor to query the height sensors 26 at the right front wheel and left front suspension units 20 and the steering effort sensor 28. The processor then transfers to block 90 and calculates, according to several relationships described below, a desired ride height for the left and right front suspension unit to compensate for pull.

First, the steering effort sensor 28 generates a signal representing the total steering effort applied by the driver to maintain vehicle straight line tracking, SWT. The processor breaks the SWT signal into two components, TRH and TRC. The TRH component represents the steering effort due to side-to-side variation in suspension ride height. The TRC component represents the remainder of the steering effort.

To determine TRH, the processor calculates the amount of steering wheel effort due to the difference in the ride height measured at the left and right front wheels according to the following relationship:

$$TRH = (LF_{rh} - RF_{rh})/K_2.$$

$K_2$ is a unique, empirically determined constant for each different suspension design.

TRC represents the remainder of the steering effort, which is due to several factors, such as road crown, tire construction, alignment and cross wind. The processor determines TRC according to the following relationship:

$$TRC = SWT - TRH.$$

Next, the processor determines the desired left and light front ride heights necessary to reduce the steering effort to maintain vehicle straight line tracking. The processor determines the road crown compensation factor, and determines the ride heights according to the following relationships:

$$DLF_{rh} = RHS - \frac{1}{2} * K_2 * TRC$$

$$DRF_{rh} = RHS + \frac{1}{2} * K_2 * TRC$$

The processor after performing these calculations then proceeds through the system as described above in reference to FIG. 4 at block 52 to adjust the suspension units 20 to reduce the steering effort required to maintain vehicle straight line tracking.

Various modifications and variations will occur to those skilled in the arts to which this invention pertains. For example, the particular sensors used in conjunction with the disclosed system may be varied from those herein and the system may be-operated according to various time constants and changes in window size and other values for the suspension dependant constants utilized in the computational scheme described above. These and all other variations which basically rely on the teachings by which this disclosure has advanced the art are properly considered within the scope of this invention as defined by the appended claims.

We claim:

1. An apparatus for reducing a steering effort applied by a driver to a steering wheel of an automotive vehicle to maintain straight line tracking of the vehicle, comprising:

an adjustable suspension unit interposed between a steerable road wheel and a vehicle chassis so as to enable adjusting a ride height of said vehicle;

height sensing means for generating a height signal corresponding to said ride height of said vehicle;

inclinometer means mounted on said chassis for measuring a roll angle of said chassis about a longitudinal axis of said chassis and for generating a roll angle signal corresponding to said roll angle; and processor means for receiving said height and roll angle signals and generating a desired ride height signal therefrom according to:

$BARH = Tan^{-1}\{(LF_{rh} - RF_{rh})/TW\};$
$RC = BA - BARH;$
$DLF_{rh} = RHS - \frac{1}{2} * TW * Tan(RC * K_1);$
$DRF_{rh} = RHS + \frac{1}{2} * TW * Tan(RC * K_1);$ wherein:

TW = tread width constant;
$K_1$ = ride height adjustment constant;
RHS = predetermined nominal right and left ride height specification;
$LF_{rh}$ = left front ride height as read by height sensor;
$RF_{rh}$ = right front ride height as read by height sensor;
BA = body angle relative to true horizontal as read by inclinometer means;
BARH = body angle due to ride height differential;
RC = road crown;
$DLF_{rh}$ = desired left front ride height;
$DRF_{rh}$ = desired right front ride height, and commanding said adjustable suspension unit to adjust responsive to said desired ride height signal whereby said steering effort required to maintain vehicle straight line tracking is reduced.

2. The apparatus according to claim 1, further comprises steering effort sensing means for generating a steering effort signal proportionate to deviations in said steering effort, said steering effort sensing means being interposed between said steering wheel and said road wheel, whereby said processor means further receives and uses said steering effort signal for generating said desired ride height signal.

3. An apparatus for reducing a steering effort applied by a driver to a steering wheel to maintain straight line tracking of a vehicle, comprising;

an adjustable suspension unit interposed between a steerable road wheel and vehicle chassis so as to enable adjusting the ride height of said vehicle;

height sensing means for generating a height signal corresponding to the ride height of said vehicle;

steering effort sensing means interposed between said steering wheel and said road wheel for measuring deviations in said effort applied at the steering wheel and for generating a steering effort signal corresponding to said deviation; and processor means for receiving said height and steering effort signals and generating a desired ride height signal therefrom according to:

$TRH = (LF_{rh} - RF_{rh})/K_2;$
$TRC = SWT - TRH;$
$DLF_{rh} = RHS - \frac{1}{2} * K_2 * TRC$
$DRF_{rh} = RHS + \frac{1}{2} * K_2 * TRC$ wherein:

TRH = steering wheel torque due to ride height differential;
$LF_{rh}$ = left front ride height as read by height sensor:
$RF_{rh}$ = right front ride height as read by height sensor;
$K_2$ = torque adjustment constant;
TRC = Torque due to road crown, tires,.alignment, cross wind, etc.;
SWT = steering wheel torque as measured by torque sensing means;
RHS = predetermined nominal right and left ride height specification;
$DLF_{rh}$ = desired left front ride height;
$DRF_{rh}$ = desired right front ride height, and commanding said adjustable suspension unit to adjust responsive to said desired ride height signal whereby said steering effort required to maintain vehicle straight line tracking is reduced.

4. The apparatus according to claim 3, further comprising inclinometer means mounted on said chassis for measuring a roll angle of said chassis about a longitudinal axis of said chassis and for generating a roll angle signal corresponding thereto, whereby said processor means further receives and uses said roll angle signal for generating said desired ride height signal.

5. A method for reducing a steering effort applied by a driver to a steering wheel of a vehicle to maintain straight line tracking of the vehicle, the vehicle having steerable road wheels, a chassis, a plurality of adjustable suspension units, comprising the steps of:

continuously measuring a deviation in ride height at each adjustable suspension unit of said steerable road wheels while said vehicle is traveling and generating a height signal corresponding to said ride height;

determining a road crown compensation factor by measuring a roll angle about a longitudinal axis of said chassis relative to a true horizontal and determining a component of said roll angle due to a front ride height differential and a component of said roll angle due to a road crown, and generating a compensation factor signal corresponding to said roll angle component due to road crown;

determining a desired ride height based upon the following formula:

$BARH = Tan^{-1}\{(LF_{rh} - RF_{rh})/TW\{$
$RC = BA - BARH$
$DLF_{rh} = RHS - \frac{1}{2} * TW * Tan (RC, K_1)$
$DRF_{rh} = RHS + \frac{1}{2} * TW * Tan (RC * K_1)$ wherein:

TW = tread width constant;
$K_1$ = ride height adjustment constant;
RHS = predetermined nominal right and left ride height specification;
$LF_{rh}$ = left front ride height as read by ride height sensor;
$RF_{rh}$ = right front ride height as read by ride height sensor;
BA = body angle relative to true horizontal as read by inclinometer means;
BARH = body angle due to ride height differential;
RC = road crown;
$DLF_{rh}$ = desired left front ride height;
$DRF_{rh}$ = desired right front ride height,
and generating a desired ride height signal corresponding to said desired ride height; and commanding said adjustable suspension unit to adjust said chassis to said desired ride height and thereby reducing said steering effort required to maintain vehicle straight line tracking.

6. The method according to claim 5, wherein the step of determining said steering compensation factor further comprises continuously measuring torque applied to said steering wheel and determining a component of said torque due to a front ride height differential and a remaining torque component and generating said compensation factor signal corresponding to said remaining torque component.

7. The method according to claim 6, wherein the step of determining said desired ride height is based upon the formula:

$TRH = (LF_{rh} - RF_{rh})/K_2;$ $TRC = SWT - TRH;$ $DLF_{rh} = RHS - \frac{1}{2}*K_2*TRC$ $DRF_{rh} = RHS + \frac{1}{2}*K_2*TRC$ wherein:

TRH=steering wheel torque due to ride height;

$LF_{rh}$=left front ride height as read by ride height sensor;

$RF_{rh}$=right front ride height as read by ride height sensor;

$K_2$=torque adjustment constant;

TRC=Torque due to road crown, tires, alignment, cross wind, etc.;

SWT=steering wheel torque as measured by torque sensing means;

RHS=predetermined nominal right and left ride height specification;

$DLF_{rh}$=desired left front ride height;

$DRF_{rh}$=desired right front ride height.

* * * * *